United States Patent
Kontturi et al.

(10) Patent No.: US 10,902,157 B2
(45) Date of Patent: Jan. 26, 2021

(54) COMPUTER-AIDED MODELING

(71) Applicant: Trimble Solutions Corporation, Espoo (FI)

(72) Inventors: Elja Kontturi, Espoo (FI); Jukka Suomi, Espoo (FI); Ragnar Wessman, Vantaa (FI); Teemu Heikkonen, Espoo (FI)

(73) Assignee: Trimble Solutions Corporation, Espoo (FI)

( * ) Notice: Subject to any disclaimer, the term of this patent is extended or adjusted under 35 U.S.C. 154(b) by 862 days.

(21) Appl. No.: 15/005,388

(22) Filed: Jan. 25, 2016

(65) Prior Publication Data

US 2016/0217223 A1    Jul. 28, 2016

(30) Foreign Application Priority Data

Jan. 26, 2015   (FI) ...................................... 20155053

(51) Int. Cl.
*G06F 30/00*   (2020.01)

(52) U.S. Cl.
CPC ................................... *G06F 30/00* (2020.01)

(58) Field of Classification Search
CPC ................................ G06F 17/50; G06F 30/00
See application file for complete search history.

(56) References Cited

U.S. PATENT DOCUMENTS

| | | |
|---|---|---|
| 7,856,342 B1 | 12/2010 | Kfouri et al. |
| 2004/0267695 A1* | 12/2004 | Alho ....................... G06F 17/50 |
| 2007/0120870 A1* | 5/2007 | Ford ................... G06F 3/04845 |
| | | 345/619 |
| 2008/0238918 A1 | 10/2008 | Culver et al. |
| 2010/0223032 A1 | 9/2010 | Reghetti et al. |
| 2012/0069011 A1 | 3/2012 | Hurt et al. |
| 2012/0109589 A1 | 5/2012 | Thompson et al. |

FOREIGN PATENT DOCUMENTS

WO    2006/097926 A2    9/2006

OTHER PUBLICATIONS

Stack Overflow, Circle-Rectangle Collision Detection (Intersection), <https://stackoverflow.com/questions/401847/circle-rectangle-collision-detection-intersection?answertab=oldest#tab-top>, Dec. 31, 2008. 33 pages (Year: 2008).*
Finnish Search Report for Finnish Patent Application No. 20155053, dated Mar. 3, 2015, 2 pages.
Vasshaug, H., "Autodesk® Revit® Structure as a Tool for Modeling Concrete Reinforcement," Autodesk University 2013, 102 pages.

* cited by examiner

*Primary Examiner* — Doon Y Chow
*Assistant Examiner* — Carina Yun
(74) *Attorney, Agent, or Firm* — Kilpatrick Townsend & Stockton LLP

(57) ABSTRACT

A modeling application is provided with at least one spatial modificator for modifying simultaneously one or more object instances. The at least one spatial modificator may include definitions that define modifications to a model, and an action definition may define a predetermined degree of change by the modifications to a parameter of the object instances. Intersections between object instances and influence areas of spatial modificators are identified. Object instances that intersect with the influence areas may be changed according to the spatial modificator and in accordance with the predetermined degree of change.

15 Claims, 8 Drawing Sheets

COMPUTER-AIDED MODELING

RELATED APPLICATIONS

This application claims priority to Finnish Patent Application No. 20155053, filed on Jan. 26, 2015, the contents of which is hereby incorporated herein by reference in its entirety.

FIELD

The invention relates to computer-aided modeling and, particularly, modifying one or more object instances in a model.

BACKGROUND

Modeling means that a model is created from an article/structure under design for describing the article/structure to be constructed, the model containing at least information needed to illustrate the article/structure. The development of data processing systems and computers has transformed modeling into a computerized process, where a product model is created from the article/structure. A wide variety of software applications, including computer-aided design applications and three-dimensional modeling applications, are currently available to end-users to prepare or edit a model, and/or to obtain necessary information from the model.

SUMMARY

The invention relates to methods, a program product, an apparatus and a system which are characterized by what is stated in the independent claims.

The preferred embodiments are disclosed in the dependent claims.

A general aspect introduces one or more spatial modificators for local modification(s) of one or more object instances.

BRIEF DESCRIPTION OF THE DRAWINGS

In the following different embodiments of the invention will be described in greater detail with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s)/example(s), or that the feature only applies to a single embodiment/example. Single features of different embodiments/examples may also be combined to provide other embodiments.

The present invention is applicable to any computer-aided modeling system. Various programming techniques, storage of data in memory and manners of implementing databases develop constantly. This may require extra changes in the invention. Consequently, all terms and expressions should be interpreted broadly, and they are intended to describe, not to restrict, the invention.

Figure 1A:
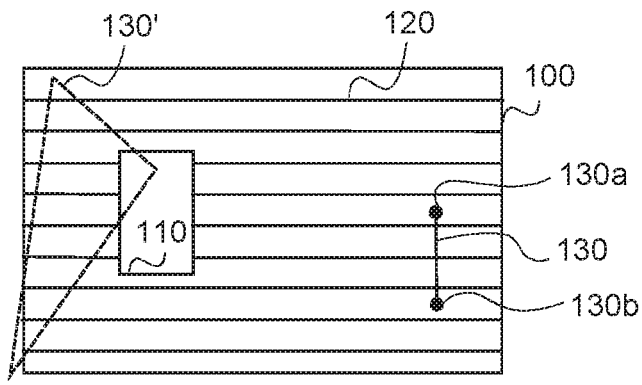
FIGS. 1A to 1H illustrate examples of spatial modificators.

To enable local modifications a concept of spatial modificators SMs is introduced. FIG. 1A illustrate a basic concept of SMs and FIGS. 1B to 1H illustrate outcomes obtained by different types of SMs after one or more actions defined in corresponding SM definitions have been performed.

In the example of FIG. 1A, a model comprises an object instance OI 100 with a hole 110, with several similar object instances OIs 120 (only one of the horizontal lines denoted for the sake of clarity), and with two SMs 130, 130' having different shapes. For example, the OI 100 may depict a concrete wall with reinforcement bars depicted by OIs 120, the wall having a hole 110 for a window, the hole hence forming part of the concrete wall definitions. In another example the OI 100 may depict a brick wall having mostly white bricks, except that there are black brick courses depicted by OIs 120, the brick wall having a window, i.e. an OI depicted by 110. In a further example, the OI 100 may depict a slab supported by beams depicted by OIs 120, the slab having a reservation 110 for stairs.

An SM is a space definable local way to modify a model of an article. According to an implementation, the SM modifies the model of the article without changing original definitions of the model of the article. It means that when the SM intersects with a model of an article, no modifications to the original definitions of the article are performed, and therefore, if the SM is deleted, or the model of the article is moved and does not any more intersect with the SM, the original definitions of the article still exist and will be used to model the article. The implementation is called below "overriding implementation". However, according to another implementation, one or more of the SM definitions may be stored to be corresponding one or more definitions of the model of the article. It means that at some stage of the modeling, modifications to the original definitions of an article may be performed. For example, a parameter value defined by the SM may be added to definitions of the article. If original definitions are modified, the original definitions do not exist anymore, and if the SM is deleted after that, or the model of the article is moved and does not any more intersect with the SM, the modified definitions will be used. The implementation is called below "changing implementation". The changing implementation may be configured to add only some (at least one) of the parameters and/or parameter values defined by the SM, and/or all of them. For example, when a model, or part of it is exported to a file format not supporting SMs, all definitions are stored in the exported version. However, depending on export functionality configuration, in the "non-exported" version no modifications to the original definitions of article are performed, or the "non-exported" version is updated to use the modified definitions, i.e. to be in line with the exported version. Although in the changing implementation, after a parameter given by SM is added to be a modified original definition, the end result to original definitions of an OI is the same as a result that is obtained by known modification techniques, the way to modify is different. In the known modification techniques the original definitions are directly modified. When SMs are used for modifying, the original definitions are not shown in a form they could be modified, neither are the original definitions directly modified; instead SM definitions are defined. Another difference is that in known techniques the modifications are not stored as separate model instances to the model, whereas the SMs are storable as separate model instances to the model even in the changing implementation. Further, since SM definitions may be created before any intersecting OI is created, one may say that modifying of an original feature/parameter value/parameter is performed before the original exists.

It should be appreciated that herein "article" means an item that will or may exist in the real world or at least is planned to exist in the real world. Further, it should be appreciated that the term "article" used herein means, in addition to one or more single pieces/items/elements/constructions, one or more parts, one or more assemblies including sub-assemblies, one or more structures, and one or more connections with their articles, like bolt(s), weld(s) or reinforcement splices(s).

The SM may have any shape and be in any arbitrary position in the three-dimensional space. In other words, an SM may be a point, a curve segment with any width, a surface area with any width and area shape, and a three dimensional space solid with any shape. SM definitions comprise at least geometry information, its location in the model and action definitions for one or more actions depending on an SM type. In other words, there are no restrictions to the size and shape of an SM. Further, there are no restrictions for an SM type or the action(s) to be performed, i.e. an SM may modify any feature/parameter, or cause such a modification, depending on the SM type used when the SM was created, as will be described by the examples illustrated in FIGS. 1B to 1H, without restricting the invention to the disclosed examples. Examples of action definitions comprises providing a parameter with a value and adding/deleting a parameter (with a value).

The geometry information and location depends on the geometric shape of the SM and they may be defined according to known geometric rules or using any ways/means to provide the geometry information and location. For example, geometry information for a strip (or curve) 130, geometry information may comprise at least a starting point 130$a$ and an end point 130$b$ between which the SM is created and by means of which the location may be calculated, or at least a direction angle and the starting point 130$a$ or the end point 130$b$ wherefrom the SM is created to a finite or an infinite distance. For an SM having a specifiable size, the geometry information may be called size information.

Further, additional information, such as an interaction region IR or an influence area, and/or a function defining the shape of the SM, may be given. For example, the strip shape 130 of the SM may be a curve having any shape: a straight line, an arc, a wavy curve, a zigzag curve etc. By means of the IR, a thickness for a surface or for a strip, or an extension of a solid, i.e. a kind of safety marginal and/or offset, can be defined to "forgive", for example, at least slight errors on size or location of an SM so that such errors do not affect to the end result, as will be described in more detail below. It should be appreciated that the IR may be used for other purposes as well.

In principle, if an SM intersects with an OI the SM definitions (values) are used instead of the definitions for the OI. In other words, the parameter values defined in the SM override the parameter values defined for the OI, or complement the definitions for the OI if no value is given for the parameter in the definitions for the OI. Hence the SM may be called a local adder tool (a local parameter adder tool), or a local definer tool (a local parameter definer tool), i.e. a local tool that defines, or by means of an action to be performed causes, one or more features/parameter values/parameters to be used, including indicating one or more parameter values/parameters in the definitions for the OI to be interpreted as non-existing (or deleted). In the overriding implementation, the definitions for the OI are not replaced or changed, they are "ignored". In other words, they remain intact. This provides reversibility to the modifying: deletion of an SM results the use of definitions for the OI. There is no need to track what the definitions for the OI have been before creation of the SM since the creation of the SM did not affect to the definitions for the OI (although the definitions may not be used because SM definitions are used instead). In the changing implementation the above applies until one or more definitions are stored to be corresponding definitions for the OI. This reversibility is missing from known modifying methods, that either rely on tracking changes and using the information to revert back to previous situation, or require a new modification of each object whose definitions have been modified. Hence, the known modifying methods are prone to errors.

The SM is a group modifying tool that enables modifying simultaneously one, two, three, etc. (any number) OIs. Using FIG. 1A and the brick wall example: SM 130' modifying OI 100, OI 110, and all other OIs 120 except those on the right hand side of the OI 110; SM 130 modifying three OIs 120, namely the one just below OI 110 and two OIs 120 above it on the right hand side of the OI 110. Basically, an SM is a generic SM that may be used for modifying one to multiple OIs that are different from each other or similar with each other, i.e. the generic SM may be used for any kind of OIs. However, an SM may comprise one or more additional definitions ADs that change the generic SM to a non-generic SM, and thereby may cause that although an SM intersects with an OI, SM definitions will not be used but definitions for the OI are used, as will be described in more detail below. None of the known modifying methods can be used in above disclosed ways, the known modifying methods require that the user selects OIs which to modify and then modifies, including deleting or adding, the definitions of selected OIs. Examples of such ADs include "apply to a specific type of OI", such as "apply to beams", "apply to reinforcement", or "apply to electric cables"; "apply to an OI intended to be manufactured from a specific material", such as "apply to steel", "apply to concrete", "apply to plastic"; or "apply to every $n^{th}$ OI", such as "apply to every third OI"; and/or "do not apply to . . . ", such as "do not apply to hollows", or in case of a definite surface SM or a definite space solid SM "apply OIs completely within me", or "apply OIs extending out of me. Further, if the SM definitions comprise a value indicating a length or a distance or a dimension, the value may be associated with information, like a flag, indicating whether or not the value is an absolute value or a relative value. Further, it should be appreciated that instead of an explicit value a function with which the value can be calculated, may be given, or one or more logical properties, disclosed in U.S. Pat. No. 7,765,240 may be used.

In the following, different examples of SMs will be described using a strip SM with a definite length without restricting the examples to such an SM shape. Implementing the examples to SMs having another shape and/or one or more infinite dimensions and/or other function is a straight-forward process to one skilled in the art after he/she has studied the examples described herein.

Figure 1B:
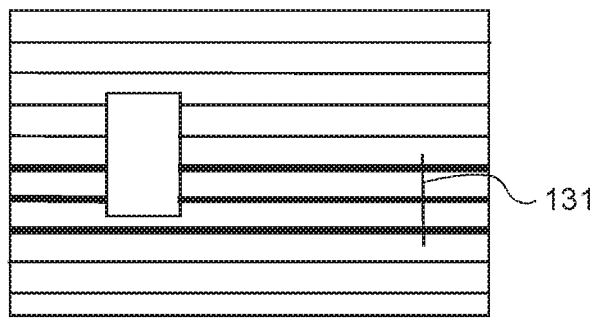

FIG. 1B illustrates an SM type designed to be used with a modeling system providing a repetition object type. Such a modeling system is described in a Finnish patent application no 20145599 assigned to the applicant, and hereby incorporated by reference. A repetition object is used for modeling one or more real-world articles by corresponding one or more repetition instances, a repetition object comprising at least one finite surface definition that defines a geometry definition surface and its location in the model, and at least information, such as a primary guideline and zero or more secondary guidelines, with which one or more geometry guide surfaces or one or more geometry guide curves may be created, wherein a repetition instance, corresponding to an OI herein, of a repetitive article is determined based on an intersection of the at least one geometry definition surface and a geometry guide surface or a geometry guide curve that is created according to the information. Further, object properties (i.e. object characteristics) for OIs are defined in primary guideline definition information.

In FIG. 1B, the SM is a primary guideline type, and more precisely a primary guideline overriding strip PGLOS 131, by means of which one or more of the properties definable by a primary guideline, such as spacing properties, and object properties, may be locally overridden or complemented by the PGLOS. In the example of FIG. 1B, PGLOS definitions have at least a starting point and an end point on the primary guideline and at least one value for at least one property. The PGLOS is interpreted to go along the primary guideline between the starting point and the end point. However, the starting point and/or the end point of the PGLOS does not necessary locate on the primary guideline, it/they may as well be projected on the primary guideline. For example, the points may locate near the hole and be associative to the hole, so that if the hole is moved, the points move correspondingly. The PGLOS affects to those OIs that are created using the local region of the primary guideline along which the PGLOS is interpreted to go along. In the illustrated FIG. 1B, PGLOS definitions define a thickness to be double of the original thickness Although not illustrated separately, for secondary guidelines, an SM called herein a secondary guideline overriding strip SGLOS may be provided to locally override spacing information defined by a secondary guideline, for example. The SGLOS has a starting point and an end point, and it is interpreted to go along the secondary guideline between the points in a similar way as described above with the PGLOS.

It should be appreciated that if a guideline is deleted it depends on an implementation whether or not all guideline type SMs on the deleted guideline are also deleted.

The SM types illustrated in FIGS. 1C to 1H may be used with OIs created with the repetition object type, as well as OIs created by other means, such as actual objects disclosed in the Finnish patent application no 20145599, or objects disclosed in U.S. Pat. No. 7,856,342, or in "Autodesk® Revit® Structure as a Tool for Modeling Concrete Reinforcement", (SE2925) by Håvard Vasshaug—Dark, or virtual objects, entity based objects and outline based objects disclosed in US patent application 2013/0328872 or in U.S. Pat. No. 7,617,076, for example. In other words, the SM types illustrated in FIGS. 1C to 1H may be used with OIs that are not individual objects although still modelling one or more real world articles and with OIs that are individual objects or copies of individual objects modelling one or more real world articles. Further, depending on an implementation, an SM type having a starting point and/or an end point on an OI, or on a geometry definition surface, may be configured to adapt according to changes on the OI, or the geometry definition surface, or not to adapt, or the adaptability may be a separate definition with a default value that may be overridden by a user input. In addition, an SM definition may define that an SM attaches to an OI so that if the OI is copied, the SM will be copied.

Figure 1C:
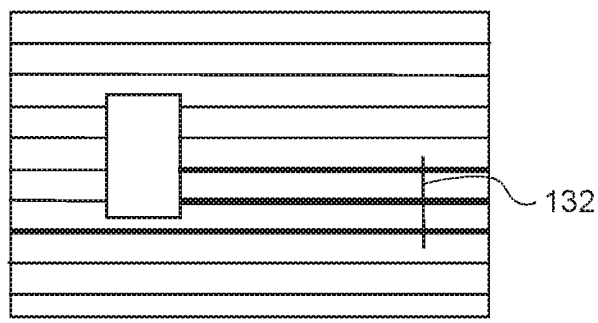

In FIG. 1C, the SM is a property strip PROPS 132, by means of which one or more of object properties may be locally overridden or complemented by the PROPS. In principle, with a PROPS every property of an intersecting OI may be overridden, or a new property provided, except that in the example the location is not modifiable by a PROPS, for that there is a specific strip disclosed with FIG. 1D. In the example of FIG. 1C, the PROPS definitions have at least a starting point, an end point and at least one value for at least one property. For example, in the illustrated FIG. 1C, PROPS definitions may define a thickness to be double of the original thickness, or the definitions may define the exact thickness, which in the illustrated example is bigger than the thickness in the OI definitions.

As can be seen, the difference between the PGLOS and the PROPS is that the PGLOS affects to all OIs that are created based on an intersection of at least one geometry definition surface and a geometry guide surface or a geometry guide curve, described above, if one of the OIs, and hence the intersection, intersects with the PGLOS, whereas the PROPS is more local and affects only OIs intersecting with the PROPS.

Figure 1D:
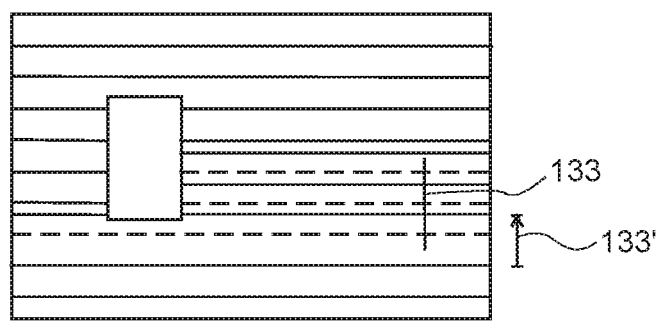

In FIG. 1D, the SM is a move strip MOS 133, by means of which intersecting OIs are moved/displaced from their original location indicated by a dash line in FIG. 1D. In the example of FIG. 1D, the MOS definitions have at least a starting point, an end point and a value for a displacement 133'. The displacement 133' value may be given as a value between the first not moved OI in the movement direction and the nearest moved OI. Depending on an implementation, the displacement may be calculated by default along the MOS, or from an intersection point of the MOS and an OI using an angle to the OI or to the MOS, such as perpendicular, or another angle, to the OI or to the MOS, or no default is used but the user is prompted to define a calculation way, or a default is used but a user input may override the default value. In other words, the displacement may be to any direction. In the example illustrated in FIG. 1D the displacement is upwards.

Figure 1E:
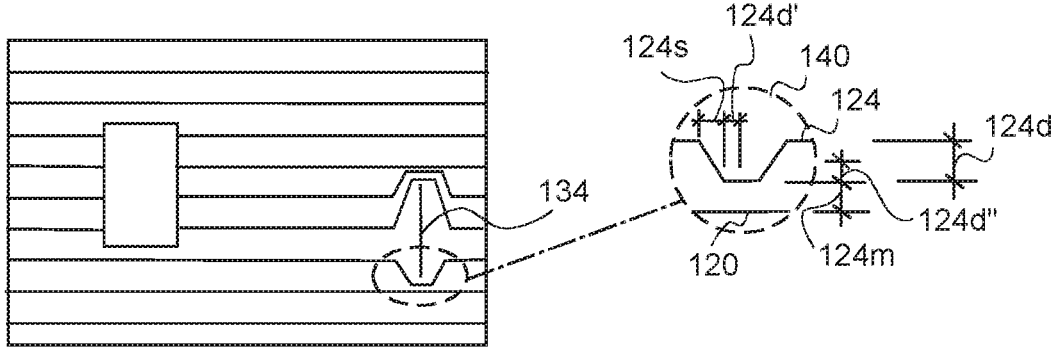

In FIG. 1E, the SM is an avoid strip AVOS 134, by means of which intersecting OIs are modified to circumvent a certain location (spot) or area, as is more clearly illustrated in the zoomed depiction 140 which shows a non-intersecting OI 120 and an intersecting OI 124. In the example of FIG. 1E, the AVOS definitions have at least a starting point, an end point, and information for one or more transition lengths calculated from the AVOS and indicating the distance where circumventing ends. In the illustrated example, the transition length is a combination of a slope length 124s and a safety distance length 124d', called herein a longitudinal safety distance length, the length meaning a distance in the direction of the OI. It should be appreciated that although in the illustrated example the transition length is the same on both sides of the AVOS, that need not to be the case; the slope length 124s and/or the longitudinal safety distance length 124d', i.e. the transition length may be given for both sides separately. Further, it should be appreciated that the safety distance length may be a zero. In addition, the longitudinal safety distance length 124d' and/or the slope length 124s, i.e. transition length may be infinite or longer than OI, in which case AVOS is a kind of MOS moving the OI. The slope length 124s may be determined by calculating a slope distance 124d, and then using it and a slope factor, like 1:5, or a slope angle to calculate the slope length 124s. The slope factor or the slope angle may be inputted by the user, or a default value may be used. If a default value is used, it may depend on the properties of the OI. The slope distance 124*d* may depend on a safety distance 124*d''*, called herein a crossing safety distance, and on a minimum distance 124*m* between two consecutive OIs. A value of the crossing safety distance may be the same as the longitudinal safety distance length 124*d'*, but it may be any positive value including zero. The minimum distance 124*m* may be zero or more. Further, AVOS definitions may define the "avoid direction". For example, when repetition objects, ROs, are used, the "avoid direction" may be perpendicular to the guide definition surface, or parallel the guide definition surface.

Figure 1F:
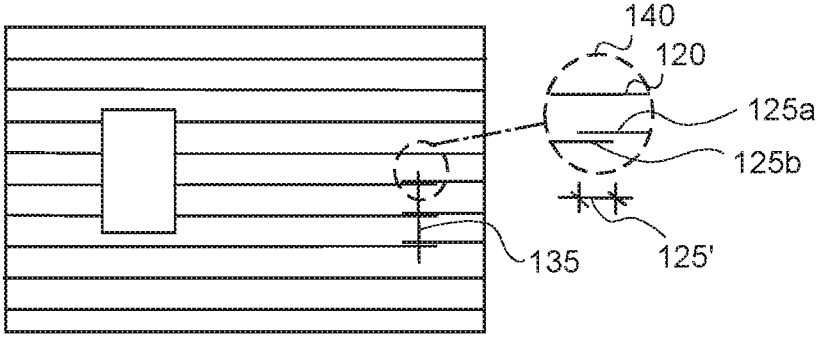

In FIG. 1F, the SM is a splitter strip SPLIS 135, by means of which intersecting OIs are split into two OIs, as is more clearly illustrated in the zoomed depiction 140 which shows a non-intersecting OI 120 and an intersecting OI 125 split into two OIs 125*a*, 125*b*. In the example of FIG. 1F, the SPLIS definitions have at least a starting point, an end point, and information whether the OIs after split have a lap slice, as is the case in the example of FIG. 1F, or are separated by a space.

If the SPLIS 135 definitions define that after split OIs will have a lap slice, the SPLIS definitions comprise further at least a lap length 125', i.e. information defining how much the splicing OIs are lapping, a lapping side and how the splicing OIs are placed in relation to each other, i.e. which one of the OIs keeps its location and to which direction the other OI is moved. Examples of the direction include on top, on bottom, to the right and to the left. It should be appreciated that any direction may be used. In the illustrated example, the lapping side defines that the middle of the lap length is on the SPLIS 135. Other alternative include that the lap length is on right from the SPLIS 135 or on left from the SPLIS 135. Further, the SPLIS definitions may define stagger information, i.e. information with which it is possible to define that every $n^{th}$ split takes place from a certain distance (which may be called a stagger offset) from the SPLIS either to the right or to the left from the SPLIS. In the illustrated example of FIG. 1F the stagger information is "none", but the stagger information may define that every second OI is split into two at a distance double the lap length to the left, or to the right, or in turns to the left and to the right, for example. There are no limitations what the stagger information comprise, so more complex split patterns may be created by means of the stagger information. Further, the SPLIS 135 definitions may define placing information, i.e. how the lapping OIs and/or their lapping ends are placed and possibly further modified. For example, in the illustrated example, assuming that the starting point of the SPLIS is towards the bottom of the page, the placing information defines that the whole OI which is based on the right hand side of the split OI, is moved upwards towards the end point (or along the guide definition surface if an OI is based on a repetition object, RO) to a certain distance from the other. Further, it is possible to define, as part of the placing information, that only the overlapping end part is moved, or overlapping end part and a certain amount of non-overlapping part after the overlapping end part towards the other end part are moved. In other words, the placing information provides further detailing possibilities.

If the SPLIS 135 definitions define that OIs will be separated by a space, the OI definitions comprise further at least a value for the space, or the value may depend on the OI and its properties. The value for the space may be given by a lap length that is preferably zero or less, so that it is easy to detect that the SPLIS is to separate OIs. For example, the value may be a negative lap length 125' value. It should be appreciated that the definitions may comprise also the lapping side and/or the stagger information. This kind of separating SPLIS may be used to create functional joints, for example.

The SPLIS 135 definitions which have a lap length zero or less may also comprise coupler information by means of which instances representing coupler devices, or connections, are created between OIs created by the SPLIS 135, and ensures that the space/gap between the two OIs is a proper one.

It should be appreciated that separate strip types may be defined for the splicing and for separating and/or for creating coupler device instances.

Figure 1G:
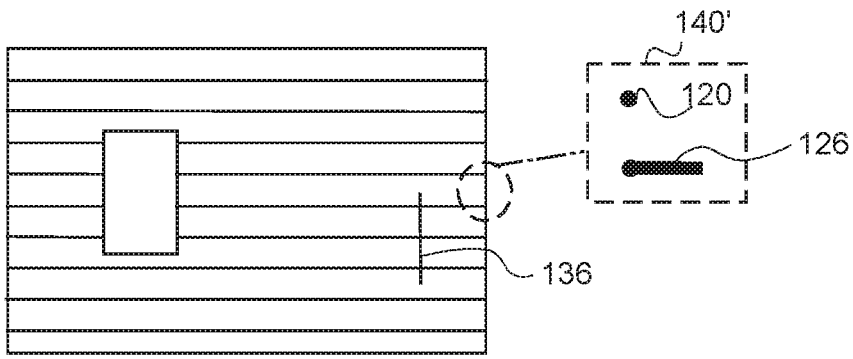

In FIG. 1G, the SM is an end detailing strip EDES 136, by means of which ends of intersecting OIs that are nearer to EDES 136 are modified to be different, as is more clearly illustrated in the zoomed cut section depiction 140' which shows an end detail of a non-intersecting OI 120 and an end detail of an intersecting OI 126. In the example of FIG. 1G, the EDES definitions have at least a starting point, an end point, and end detailing information. For example, if OI is an I-beam with end detailing information that an end plate is provided at the end, by means of an EDES, the end plate may be removed or have another thickness; or if OI definitions does not define the end plate the end plate may be added by an EDES. Another example is, when OI is a reinforcement bar with end detailing info "straight end", by means of and EDES, the end detailing may be modified to have an anchor hook. It should be appreciated that the content of the end detailing information depends on OI, and OI-type specific EDESs may be created, such as an EDES for reinforcement bars, an EDES for I-beams, an EDES for concrete finishing, etc.

Figure 1H:
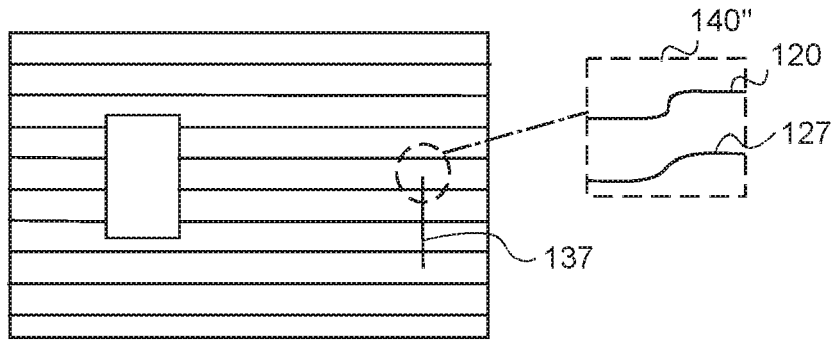

In FIG. 1H, the SM is a radius strip RADS 137, by means of which bending radius of intersecting OIs are amended, as is more clearly illustrated in the zoomed cut section depiction 140'' which shows how a non-intersecting OI 120 is bent and how an intersecting OI 127 is bent. In the example of FIG. 1H, the RADS definitions have at least a starting point, an end point, and a radius.

It should be appreciated that one or more of the examples illustrated in FIGS. 1C to 1H may be defined to be primary guideline types, i.e. having a starting point and an end point interpreted to be on a primary guideline and affecting to OIs created by means of the primary guideline (and based on an intersection). Correspondingly, one or more of the examples illustrated in FIGS. 1C to 1H may be defined to be secondary guideline types.

Further, it should be appreciated that in other implementations PROPS and/or PGLOS may be the only strip types by means of which all local modifications are defined. In addition, it should be appreciated that it is possible to create a specific strip type for each specific situation and/or material, and the above described examples are only examples described to illustrate different possibilities without restricting the invention to the examples.

Figure 2:
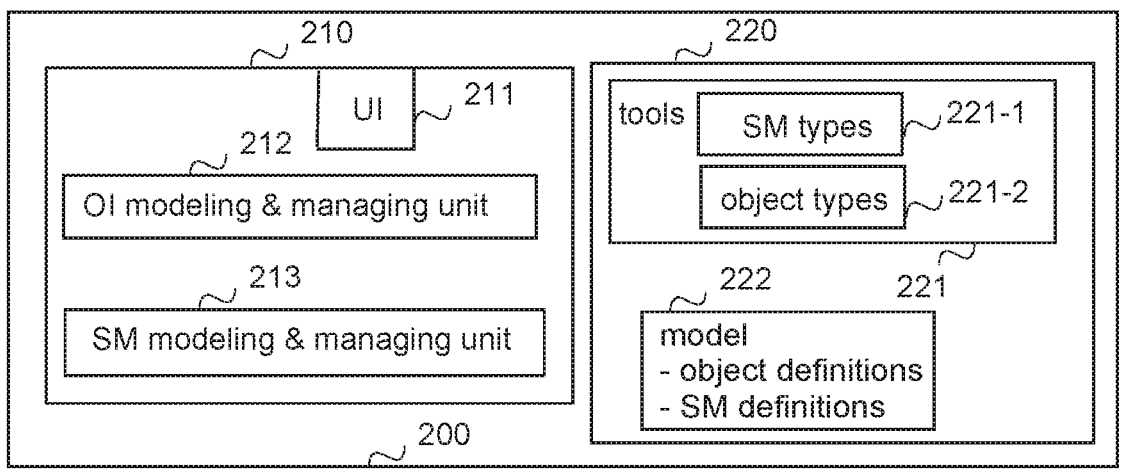
FIG. 2 shows a simplified architecture of an exemplary system and a schematic block diagram of an exemplary apparatus.

FIG. 2 illustrates a simplified modeling system describing only some logical units with their operative connections, the implementation of which may deviate from what is presented. It is obvious to a person skilled in the art that the system may also comprise other functions and structures that need not be described in greater detail here. The more detailed structure of the system is irrelevant to the actual invention.

The modeling system 200 illustrated in FIG. 2 is a simplified modeling system that comprises one or more apparatuses 210 (only one shown in FIG. 2) and a modeling environment with one or more data storages 220 (only one shown in FIG. 2) or memories that may be external data storage to an apparatus or an internal data storage or partly external and partly internal.

The apparatus 210 may be any computing apparatus that can be configured to create and/or modify and/or edit and/or change and/or view and/or output information from a model. For that purpose the apparatus 210 comprises one or more user interfaces 211, an OI modeling and managing unit 212 and an SM modeling and managing unit 213. Examples of such apparatuses include a user terminal or a work station, such as a laptop, a smartphone, a personal computer, a tablet computer, a field device, an e-reading device, or a personal digital assistant (PDA), or a server, like a cloud server or a grid server.

A user interface 211 is the interface of the user, i.e. the person processing the model, to the modeling system. The user can create a model, modify a model, study it, output desired drawings and/or reports of the model, view the model, input information to the model, etc. by using the one or more user interfaces 211. For example, different pull-down menus, dialogs or pop-up menus may be used via the user interfaces to input object definitions and SM definitions, and other information for a model.

The OI modeling and managing unit 212 is for modeling articles by means of object instances (OIs). An object instance may also be called an entity, a product model, a product model of an article, a model of an article, a representation of an article, a digital article and an article. Further, instead of term "article", corresponding terms, like element and part described above, may be used as well. Since the functionality and implementation of the OI modeling and managing unit 212 bears no significance to the invention, it is not described in more detail herein The SM modeling and managing unit 213 is at least for creating SMs, and for outputting OIs so that SMs are taken into account, and its functionality will be described in more detail below. It should be appreciated that each SM type may have its own unit (a kind of sub-unit of the SM modeling and managing unit 213), or some of them share a unit, and some have corresponding own units. Further, the SM modeling and managing unit 213 may be integrated to the OI modeling and managing unit 212.

In the illustrated example, the data storage 220 in the modeling environment comprises for the modeling application different tool definitions 221, the tool definitions comprising one or more different SM types (SM type definitions) 221-1 for one or more strips and one or more different object types (object type definitions) 221-2 for articles to be modelled as OIs.

In the illustrated example, the data storage 220 comprises also one or more models 222, or more precisely one or more object definitions defining corresponding OIs and/or zero or more SM definitions defining corresponding number of SMs.

The modeling system illustrated in FIG. 2 represents the simplest modeling system. In larger modeling systems, the apparatus may be a terminal and the data storage a database with which the terminal communicates via a server. In such a system, the server may be configured to perform one or more of the OI modeling and managing unit functionalities and/or SM modeling and managing unit. The data storage may be any kind of conventional or future data repository, including distributed and centralized storing of data, managed by any suitable management system forming part of the modeling environment. An example of distributed storing includes a cloud-based storage in a cloud environment (which may be a public cloud, a community cloud, a private cloud, or a hybrid cloud, for example). The implementation of the data storage, the manner how data is stored, retrieved and updated, and the location where the OI modeling and/or OI managing and/or the SM modeling and/or SM managing are performed are irrelevant to the invention. Further, the modeling system may comprise several terminals and servers with databases, which are preferably integrated to be visible to the user as one database and one database server.

In the following, the invention will be described by using an exemplary evolved system in which a running modeling application utilizes a run-time database comprising information to be stored and already stored in a disc memory of an apparatus, without restricting the invention thereto. In another embodiment of the invention, an object-oriented database or a relation database, for example, can be utilized and used over a network, for instance.

Further, in the following, it is assumed, that a creation time is used to determine the order of SMs, without restricting described examples to such a solution. Other examples to determine the order include providing an SM with a running order number, or using globally unique identifiers (GUIDs) in a specific order, or determining the order utilizing a principle of causality and dualistic sequence information, described in more detail in a US patent application publication No. 2012/0239886, hereby incorporated by reference.

Figure 3:
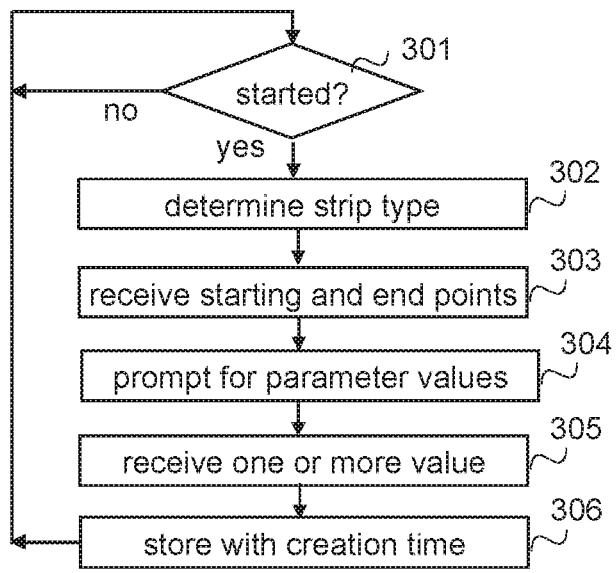
FIGS. 3 to 14 illustrate different exemplary functionalities.

FIG. 3 is a flow chart illustrating one example of creation of an SM by a user (a modeler). More precisely, it illustrates an exemplary functionality of the SM modeling and managing unit, or an SM creating sub-unit.

It is monitored in step 301, as a background process, whether or not creation of a strip is started. The start of the creation of the strip may be detected because the user selected an icon "add strip", or a specific icon for a specific type on strip. Then the strip type is determined in step 302. The strip type may be determined from the selected specific type of icon or the user may be prompted to select one of strip types available. The start point and end point are received in step 303 as user inputs, and the user is prompted to provide parameter values in step 304, at least one of which is received in step 305. The prompted parameter values depend on the determined strip type, and the user may be allowed to add new parameters with their values. For example, if the strip type is a generic strip type, a list of several parameters may be outputted to the user, the list possibly containing an "empty space" for a user defined parameter, or the outputting may be made step by step, for example starting with "indicate material to be applied to", and if "reinforcement" is selected, next step may include "diameter", "finishing", "end type", etc. Another example is that if the strip is RADS for reinforcement bars, the user may be prompted to provide the radius and nothing else. In other words, steps 304 and 305 may be performed one, two, three or more times. When the parameter values have been received, in the illustrated example the type, the starting point, the end point, and the received one or more parameter values are stored in step 306 with the creation time, and the process returns to step 301 to monitor whether or not another SM is added.

Figure 4:
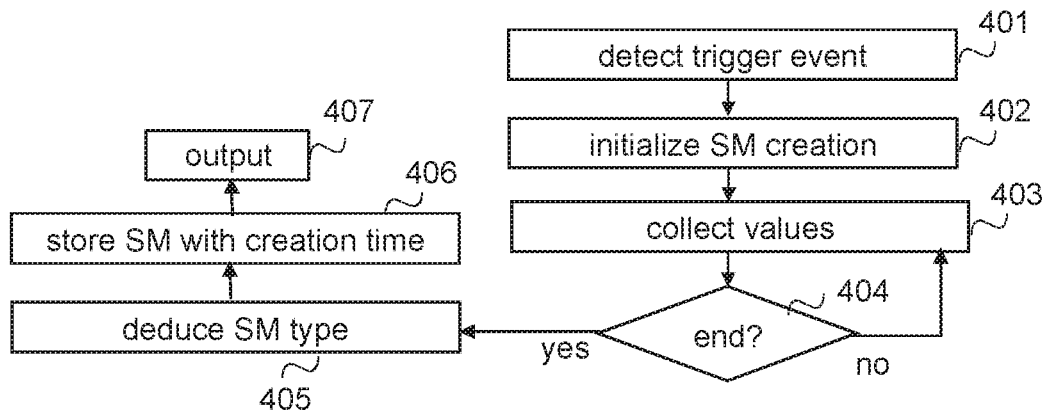

FIG. 4 is a flow chart illustrating one example of creation of an SM without an actual user involvement. More precisely, it illustrates an exemplary functionality of the SM modeling and managing unit, or an automatic SM creating sub-unit.

Referring to FIG. 4, the modeling application, or more precisely, the SM modeling and managing unit, detects in step 401 a trigger event for automatic SM creation. The modeling and managing unit may be configured to detect any kind of trigger events. An example of a trigger event is that the user has selected two or more OIs that share at least one object property, other than location. For example, OIs may have been created by copying the same OI, or they have been created on the basis of the same RO, or on the basis of two copies of one RO, or they belong to a component. A component is a group of objects that are easy to model and modify as a single unit. It should be appreciated that the group may comprise zero or more ROs and/or zero or more individual objects. Another example of a trigger event is that the user has added a certain type of OI to a model or to a specific part of a model, like a bushing insulation or an inlet sleeve. Yet another example of a trigger event is that a logic structure disclosed in U.S. Pat. No. 7,617,076 sends an internal program call to create an SM, the program call preferably containing required parameter definitions. In other words, a trigger event does not necessarily involve any user input/user action.

Then the SM modeling and managing unit initializes, in step 402, creation of an SM is initialized by determining a starting point and an end point for the SM. The points may be defined so that all selected OIs are intersecting with the SM, or the created OI is intersecting with the SM. Further, the SM modeling and managing unit collects in step 403 modified values inputted by the user to be values for the SM, if such values are inputted, until the user ends (step 404) modifying the selected OIs. When the user ends (step 404) modifying the selected OIs or adding the certain type of OI (with or without inputting modifying values), the SM modeling and managing unit deduces in step 405 from the trigger event and/or inputted modified values one or more SM types. If the trigger event is the internal program call, or a corresponding event not involving user input, steps 403 and 404 are skipped over, and the process proceeds from step 402 to step 405. After the one or more SM types are deduced, the SM modeling and managing unit stores in step 406 the one or more SM types with the values and the creation time. For example, if a diameter of a reinforcement bar is changed, the SM type may be PROPS to be applied to reinforcement bars; or if in addition also end detailing is modified, the SM type may be PROPS to be applied to reinforcement bars with all parameter values, or two SM types may be determined: PROPS to be applied to reinforcement bars and the modified diameter value as a PROPS value, and EDES to be applied to reinforcement bars and the modified end detailing as EDES values.

Another example is that if a bushing insulation is added, the SM type may be AVOS or MOS. A further example includes that an SM is created to define that beams should have a specific height, the SM type may be PROPS to be applied to beams, including beams that will be modelled later to the model. In the illustrated example, the corresponding one or more SMs are outputted in step 407 via a user interface to the user to enable the user easier cancellation of the modification by deleting the SM.

Figure 5:
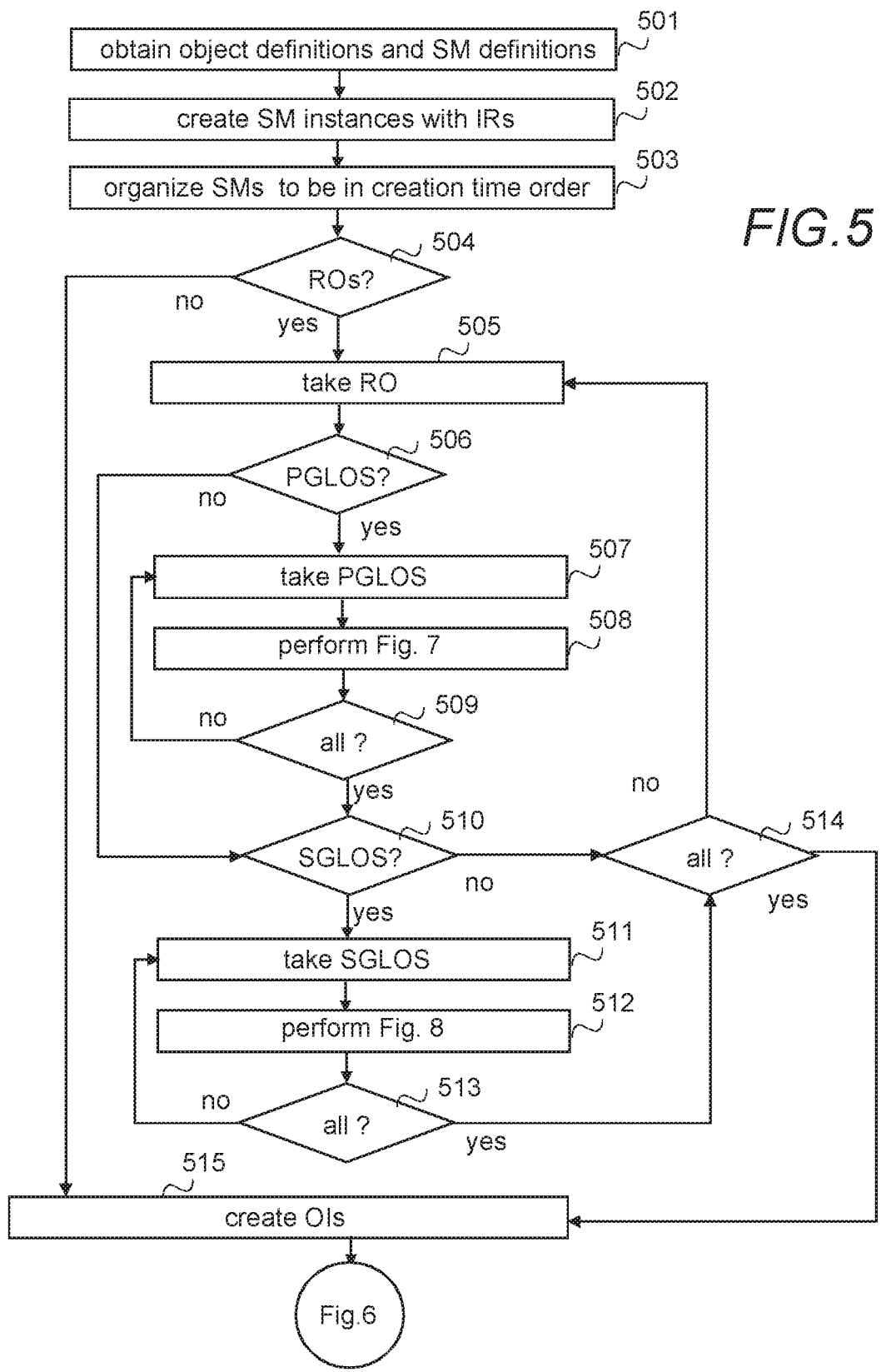
Figure 6:
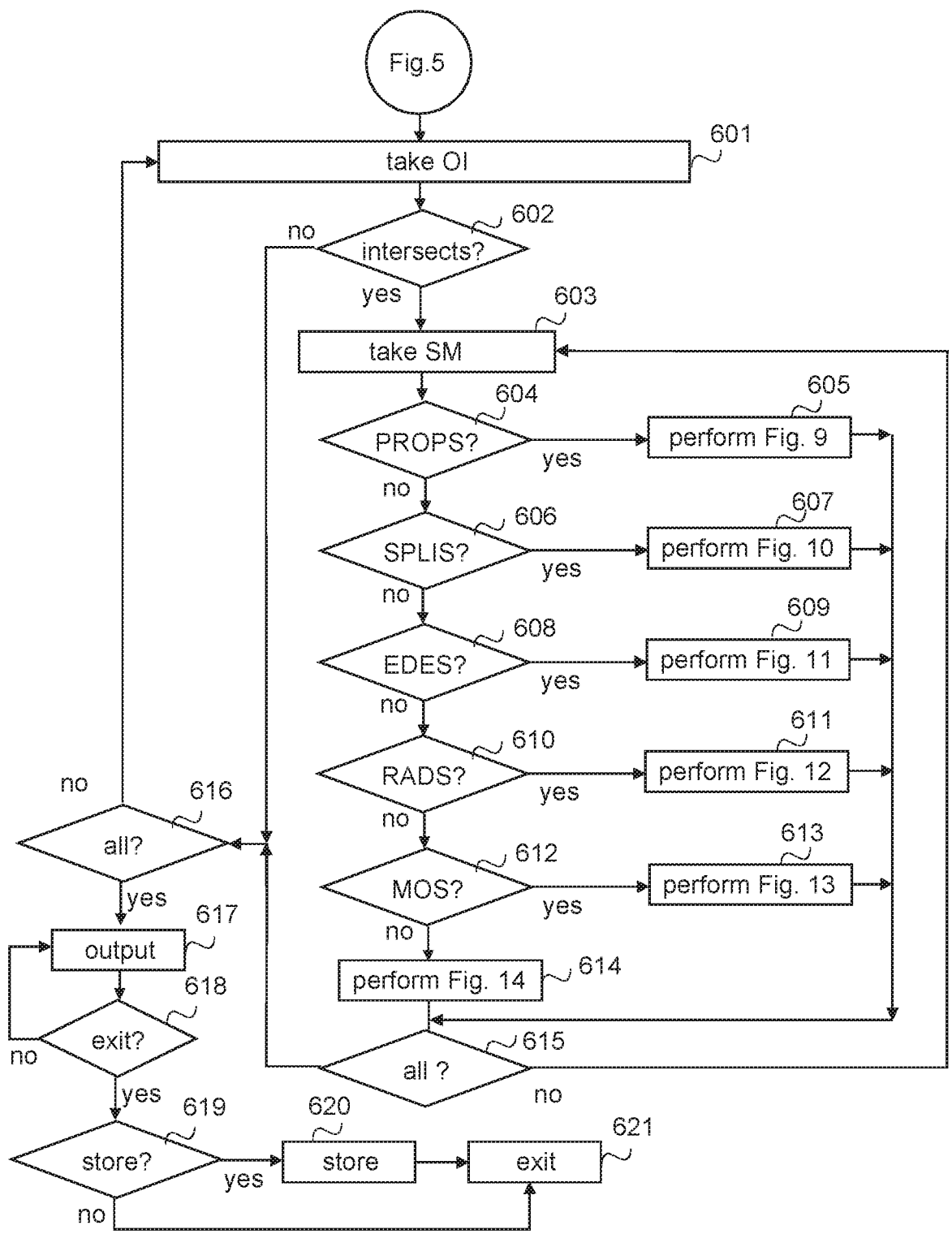

FIGS. 5 and 6 are flow charts illustrating one example of use of SMs. More precisely, they illustrate an exemplary functionality of the SM modeling and managing unit, or an SM user sub-unit. FIG. 5 includes functionality for a model comprising one or more ROs to which "guideline SMs" may be defined, and FIG. 6 the functionality once OIs have been created according to the changing implementation. In the below examples, the SM types defined above with FIGS. 1B to 1H are used, without restricting the example to use of exactly these types.

Referring to 5, the user has opened a model, or part of a model and therefore the object definitions and SM definitions the model comprises are obtained in step 501. Then SM instances are created in step 502 using geometry information, location information and IR value(s), if any defined, according to the obtained SM definitions.

Further, since in the illustrated example it is assumed that it is possible to define two or more SMs overlapping at least partly each other, and that they may have a value for the same property in their definitions, and in the example it is the last defined value that will be applied, the SM definitions are organized in step 503 to be in creation time order, from the oldest to the newest. It should be appreciated that if the first defined value will be applied, the order is from the newest to the oldest. Further, there may be one or more SM-specific rule that define which one of SMs is the decisive SM whose definitions, either for all parameter values, or for a specific parameter/parameter value, are used in case the same type of SMs overlap an OI.

Then it is checked, in step 504, whether or not the obtained object definitions contain one or more ROs. If they do, an RO is taken in step 505 to be processed. More precisely, the guideline information is processed. In the illustrated example, the SM definitions are gone through and if a PGLOS on the primary guideline of the RO is found (step 506), the PGLOS is taken in step 507 to be processed in step 508, the processing being described in FIG. 7, and when the PGLOS is processed, it is checked in step 509, whether all SMs are gone through. If not, the process goes through the SM definitions in step 506, starting from the last processed PGLOS so that at the end all PGLOSs on the primary guideline of the RO have been found and processed (answer "no" in step 506, or answer "yes" in step 509) and similar process is triggered for secondary guidelines.

Figure 8:
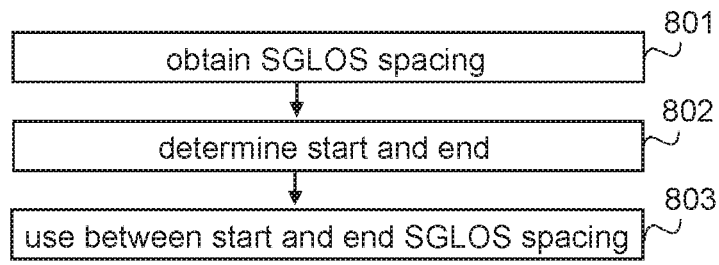

More precisely, the SM definitions are gone through from the oldest one and if an SGLOS on a secondary guideline of the RO is found (step 510), the SGLOS is taken in step 511 to be processed in step 512, the processing being described in FIG. 8, and when the SGLOS is processed, it is checked in step 513, whether all SMs are gone through. If not, the process goes through the SM definitions in step 511, starting from the last processed SGLOS so that at the end all SGLOSs on the secondary guidelines of the RO have been found and processed (answer "no" in step 510, or answer "yes" in step 513) and then the process proceeds to check in step 514 whether all ROs have been processed. If not, the next RO is taken in step 505 to be processed.

If all ROs have been processed (step 514), or there is no ROs in the model (step 504), OIs are created in step 515, and the process continues in FIG. 6, in which an OI is taken to be processed in step 601, and it is checked in step 602, whether the OI intersects with one or more SM instances. Performing the checking in the order means that if the MOS, for example, moves the OI so that after a movement defined by the MOS, the OI will intersect with an SM that the OI did not intersect with the SM before the movement, the SM is not taken into account in the processing.

If the OI intersects with one or more SM instances (step 602), the SMs, or more precisely the SM definitions of the intersecting SM instances, are gone through, starting from the oldest one, by taking in step 603 the oldest unprocessed intersecting SM to be processed.

Figure 9:
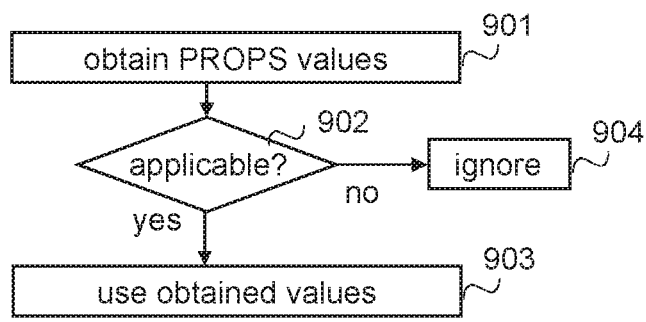

If the SM is PROPS (step 604 "yes"), the process described in FIG. 9 is performed (step 605) and then the process proceeds to check in step 615 whether all SMs intersecting with the OI have been processed. If not, the next SM is taken in step 603 to be processed.

Figure 10:
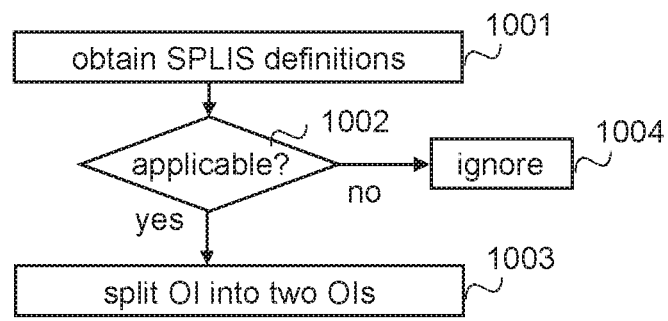

If the SM is SPLIS (step 604 "no", step 606 "yes"), the process described in FIG. 10 is performed (step 607) and then the process proceeds to check in step 615 whether all SMs intersecting with the OI have been processed. If not, the next SM is taken in step 603 to be processed.

Figure 11:
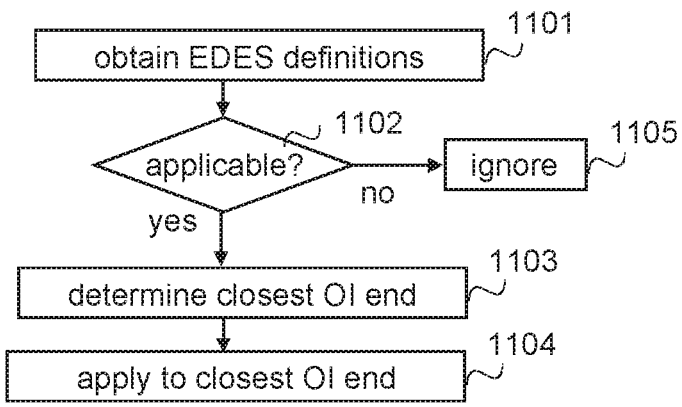

If the SM is EDES (step 606 "no", step 608 "yes"), the process described in FIG. 11 is performed (step 609) and then the process proceeds to check in step 615 whether all SMs intersecting with the OI have been processed. If not, the next SM is taken in step 603 to be processed.

Figure 12:
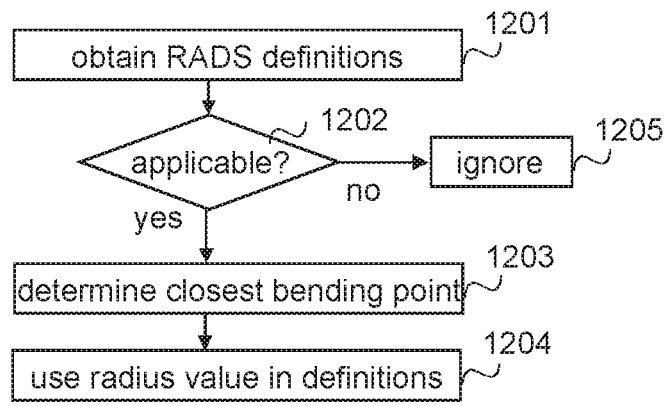

If the SM is RADS (step 608 "no", step 610 "yes"), the process described in FIG. 12 is performed (step 611) and then the process proceeds to check in step 615 whether all SMs intersecting with the OI have been processed. If not, the next SM is taken in step 603 to be processed.

Figure 13:
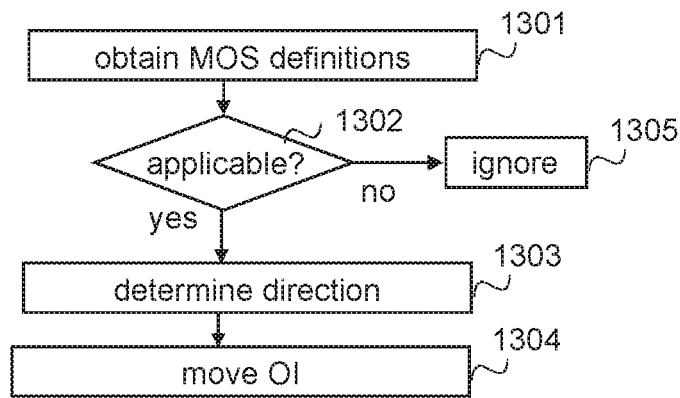

If the SM is MOS (step 610 "no", step 612 "yes"), the process described in FIG. 13 is performed (step 613) and then the process proceeds to check in step 615 whether all SMs intersecting with the OI have been processed. If not, the next SM is taken in step 603 to be processed.

Figure 14:
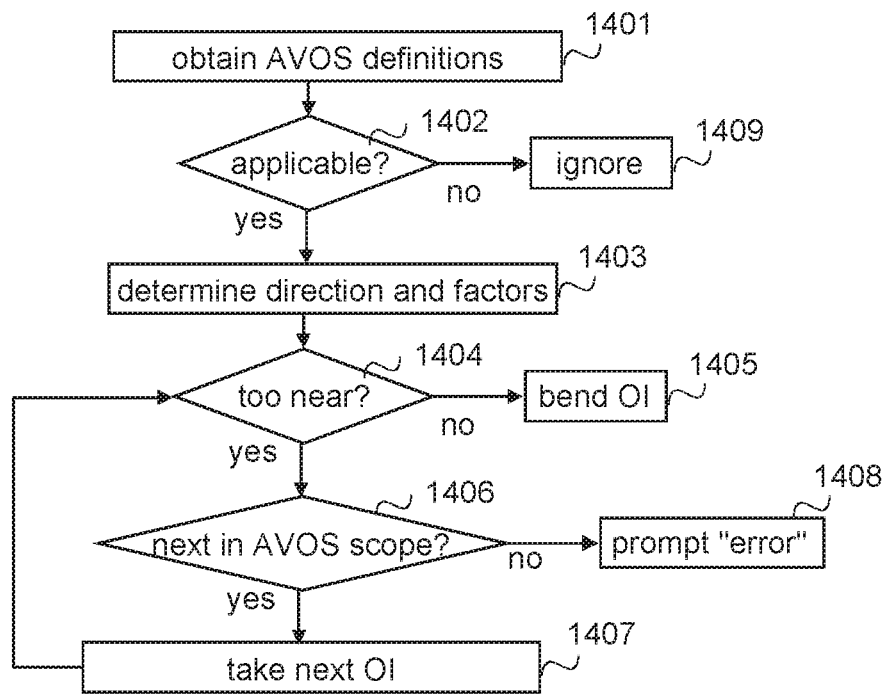

If the SM is AVOS (step 612 "no"), the process described in FIG. 14 is performed (step 614) and then the process proceeds to check in step 615 whether all SMs intersecting with the OI have been processed. If not, the next SM is taken in step 603 to be processed.

If all SMs intersecting with the OI have been processed (step 615), or the OI does not intersect with one or more SM instances (step 602), it is checked in step 616 whether or not all OIs are processed. If not, the process proceeds to step 601 to take an OI to be processed. It should be appreciated that if SPLIS is used, the two new OIs are added to be processed (but not yet anymore intersecting with the SPLIS). If all OIs are processed (step 616), the OIs are outputted in step 617, for example for the user to view the model, or to continue modeling. In the illustrated example, the outputting (and updating outputting according to new definitions, if modeling is continued, although not illustrated in FIG. 6), is continued until an indication to exit the model is received (step 618). In the illustrated example, when exiting, it is possible to store to the definitions for an OI one or more parameter values defined by an intersecting SM. For example, the user may be prompted by the OI modeling and managing unit to determine whether or not to store, and for which OIs, and if something from one or more SM definitions is to be stored (step 619) to one or more OI definitions, the storing is performed in step 620 and then the model is exited in step 621. If nothing from SM definitions is to be stored (step 619), the model is exited in step 621. Naturally, the overriding implementation does not comprise steps 619 and 620. It should be appreciated that obtaining object definitions (part of step 501) and/or creating OIs (step 515) and/or outputting the model (step 617) may be performed by the OI modeling and managing unit.

Figure 7:
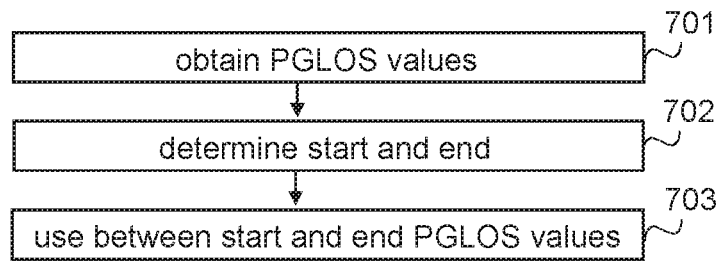

FIG. 7 is a flow chart illustrating one example of how to process a PGLOS type of an SM. More precisely, it illustrates an exemplary functionality of the SM modeling and managing unit, or the SM user sub-unit, or a guideline sub-unit, or a PGLOS sub-unit.

Referring to FIG. 7, the PGLOS definitions, including values in the PGLOS definitions are obtained in step 701, and a span for the PGLOS, i.e. a point wherefrom the PGLOS definitions start to apply and a point in which the PGLOS definitions end to apply, are determined in step 702 using the PGLOS definitions. For example, a spacing starting point may be calculated in step 702. The spacing starting point wherefrom the spacing is calculated may be the OI nearest to the starting point of the SM and not intersecting with the PGLOS, or the spacing starting point may be a default definition which the user may or may not override by a user inputted spacing starting point. Other examples of spacing starting points include a midpoint of the SM, an end point of the SM, a starting point of the SM, the OI nearest to the end point of the SM and not intersecting with the PGLOS, the OI nearest to the starting point of the SM and intersecting with the PGLOS and the OI nearest to the end point of the SM and intersecting with the PGLOS, and a user defined point.

After the span has been determined the property values in the PGLOS definitions are used in step 703 on the span, i.e. between the point wherefrom the PGLOS definitions start to apply and the point in which the PGLOS definitions end to apply. More precisely, if a property has an original value defined in the primary guideline definitions, or an earlier value in PGLOS definitions created earlier, and hence processed earlier, the original/earlier value is ignored, and the value obtained in step 701 is used; or if the property does not yet have a value, the value obtained in step 701 is used.

FIG. 8 is a flow chart illustrating one example of how to process a SGLOS type of an SM. More precisely, it illustrates an exemplary functionality of the SM modeling and managing unit, or the SM user sub-unit, or the guideline sub-unit, or a SGLOS sub-unit.

Referring to FIG. 8, the SGLOS definitions, including values in the SGLOS definitions are obtained in step 801, and a span for the SGLOS, i.e. a point wherefrom SGLOS spacing definitions start to apply and a point in which the SGLOS spacing definitions end to apply, are determined in step 802 using the SGLOS definitions. Then the spacing defined in the SGLOS definitions is used in step 803 on the span, i.e. between the point wherefrom the SGLOS spacing definitions start to apply and the point in which the SGLOS spacing definitions end to apply.

FIG. 9 is a flow chart illustrating one example of how to process a PROPS type of an SM. More precisely, it illustrates an exemplary functionality of the SM modeling and managing unit, or the SM user sub-unit, or a PROPS sub-unit.

Referring to FIG. 9, the PROPS definitions, including values in the PROPS definitions are obtained in step 901, and then it is checked in step 902 whether or not the PROPS definitions are applicable to the intersecting OI. The checking is performed using zero or more ADs in the PROPS definitions, the zero ADs meaning that the PROPS definitions are applicable. If there are one or more ADs it depends on the ADs and possibly on the OI whether or not the PROPS definitions are applicable. Examples of ADs are given above with the description of FIG. 1A.

If the PROPS definitions are applicable (step 902), the obtained one or more values are used in step 903 for the OI. More precisely, if a property has an original value defined in the definitions for the OI, or a value in PGLOS is used instead of the original value, or an earlier value in PROPS definitions created earlier, and hence processed earlier, is used instead, the original/earlier/instead used value is ignored, and the value obtained in step 901 is used; or if the property does not yet have a value, the value obtained in step 901 is used. In other words, the newest value is used in the illustrated example.

If the PROPS definitions are not applicable (step 902), they are ignored in step 904. In other words, they are not used.

FIG. 10 is a flow chart illustrating one example of how to process a SPLIS type of an SM. More precisely, it illustrates an exemplary functionality of the SM modeling and managing unit, or the SM user sub-unit, or a SPLIS sub-unit.

Referring to FIG. 10, the SPLIS definitions, or more precisely, the values in the SPLIS definitions are obtained in step 1001, and then it is checked in step 1002 whether or not the SPLIS definitions are applicable to the intersecting OI. The checking is performed using zero or more ADs in the SPLIS definitions, the zero ADs meaning that the SPLIS definitions are applicable. If there are one or more ADs it depends on the ADs and possibly on the OI whether or not the SPLIS definitions are applicable. Examples of ADs are given above with the description of FIG. 1A.

If the SPLIS definitions are applicable (step 1002), the obtained one or more definitions and values are used in step 1003 to split the OI into two OIs at a point defined according to the obtained SPLIS definitions. The ends of the two OIs created during splitting, i.e. an end nearest to the point, are created according to the obtained SPLIS definitions. Examples of the ends and how the point may be defined are described above with the description of FIG. 1F. It should be appreciated that if the point of the OI intersects with two or more SPLIS definitions, at the end of the processing the SPLIS definitions of the last created SPLIS are used (and the earlier ignored, i.e. not used).

If the SPLIS definitions are not applicable (step 1002), they are ignored in step 1004. In other words, the OI is not split.

FIG. 11 is a flow chart illustrating one example of how to process an EDES type of an SM. More precisely, it illustrates an exemplary functionality of the SM modeling and managing unit, or the SM user sub-unit, or an EDES sub-unit.

Referring to FIG. 11, the EDES definitions, including end detailing values and definitions in the EDES definitions are obtained in step 1101, and then it is checked in step 1102 whether or not the EDES definitions are applicable to the intersecting OI. The checking is performed using zero or more ADs in the EDES definitions, the zero ADs meaning that the EDES definitions are applicable. If there are one or more ADs it depends on the ADs and possibly on the OI whether or not the EDES definitions are applicable. Examples of ADs are given above with the description of FIG. 1A.

If the EDES definitions are applicable (step 1102), the closest end of the OI is determined in step 1103 to find out the end whereto apply the EDES definitions, and then the obtained one or more values and end detailing definitions are used in step 1104 for the closest end of the OI. More precisely, if an end detail or related property has an original definitions/value defined in the definitions for the OI, or a value/definition in PGLOS used instead of the original value, or an earlier value/definition in EDES definitions or SPLIS definitions created earlier, and hence processed earlier, the original/earlier/instead used value/end detailing definition is ignored, and the value/definition obtained in step 1101 is used.

If the EDES definitions are not applicable (step 1102), they are ignored in step 1105. In other words, they are not used.

FIG. 12 is a flow chart illustrating one example of how to process an RADS type of an SM. More precisely, it illustrates an exemplary functionality of the SM modeling and managing unit, or the SM user sub-unit, or an RADS sub-unit.

Referring to FIG. 12, the RADS definitions, including a radius value, are obtained in step 1201, and then it is checked in step 1202 whether or not the RADS definitions are applicable to the intersecting OI. The checking is performed using OIs current definitions and zero or more ADs in the RADS definitions. Firstly it is checked, whether or not the OI is bent at least ones. If not, the RADS definitions are not applicable. If the OI is bent at least ones, the ADs in the RADS definitions are checked. If the RADS definition does not contain AD, i.e. there is zero ADs, it means that the RADS definitions are applicable. If there are one or more ADs it depends on the ADs and possibly on the OI whether or not the RADS definitions are applicable. Examples of ADs are given above with the description of FIG. 1A.

If the RADS definitions are applicable (step 1202), the closest bending point of the OI is determined in step 1203 to find out the point whereto apply the RADS definitions, and then the obtained radius value is used in step 1204 for the OI at the closest bending point of the OI. More precisely, if, for the bending point, in the definitions for the OI an original radius value is defined, or a radius value in PGLOS is used instead of the original radius value, or currently used radius value is an earlier radius value in RADS definitions created earlier, and hence processed earlier, the original/earlier/currently used value is ignored, and the value obtained in step 1201 is used instead.

If the RADS definitions are not applicable (step 1202), they are ignored in step 1205. In other words, the radius value is not used.

FIG. 13 is a flow chart illustrating one example of how to process an MOS type of an SM. More precisely, it illustrates an exemplary functionality of the SM modeling and managing unit, or the SM user sub-unit, or a MOS sub-unit. In the example it is assumed that when a MOS is created, it has been checked that there is enough space for a displacement (a movement), i.e. there will be enough space between the last moved OI and the first not moved OI. However, it should be appreciated that checking, whether or not there is enough space may be performed later, for example between below described steps 1303 and 1304, or within step 1302.

Referring to FIG. 13, the MOS definitions, including a value for the displacement, are obtained in step 1301, and then it is checked in step 1302 whether or not the MOS definitions are applicable to the intersecting OI. The checking is performed using zero or more ADs in the MOS definitions, the zero ADs meaning that the MOS definitions are applicable. If there are one or more ADs it depends on the ADs and possibly on the OI whether or not the MOS definitions are applicable. Examples of ADs are given above with the description of FIG. 1A.

If the MOS definitions are applicable (step 1302), the movement direction of the OI is determined in step 1303, and then the OI is moved in step 1304 to the direction according to the value for displacement. More precisely, the location defined in the definitions for the OI, or in PGLOS used instead of the original location, or an earlier location defined in MOS definitions created earlier, and hence processed earlier, the original/earlier/instead used location is ignored. As to the determination of the movement directions, examples are disclosed above with the description of FIG. 1D.

If the MOS definitions are not applicable (step 1302), they are ignored in step 1305. In other words, the OI is not moved.

FIG. 14 is a flow chart illustrating one example of how to process an AVOS type of an SM. More precisely, it illustrates an exemplary functionality of the SM modeling and managing unit, or the SM user sub-unit, or an AVOS sub-unit.

Referring to FIG. 14, the AVOS definitions, including different values needed for bending an OI, are obtained in step 1401, and then it is checked in step 1402 whether or not the AVOS definitions are applicable to the intersecting OI. The checking is performed using zero or more ADs in the AVOS definitions, the zero ADs meaning that the AVOS definitions are applicable. If there are one or more ADs it depends on the ADs and possibly on the OI whether or not the AVOS definitions are applicable. Examples of ADs are given above with the description of FIG. 1A.

If the AVOS definitions are applicable (step 1402), the bending direction of the OI and the bending factors are determined in step 1403. The bending factors covers herein at least a transitional length and a slope distance described in more detail above in the description of FIG. 1E. The bending direction may be defined in the AVOS definition, or the closest end of the AVOS from the intersection point of the OI and the AVOS is used to determine the bending direction. In the illustrated example it is then checked, in step 1404, whether or not the bent OI will be after the bending too near to a next corresponding OI, i.e. OI of the same type, in the bending direction. This checking may be performed by using the minimum distance value in the AVOS definitions, or a corresponding value may be part of OI definitions or depend on OI type. If the bent OI will not be after the bending too near to the next corresponding OI, the OI is bent in step 1405 to the determined direction according to the determined bending factors.

If the bent OI will be after the bending too near to the next corresponding OI in the bending direction (step 1404), it is checked, in step 1406, whether or not the next OI is in the AVOS scope, i.e. intersects with the AVOS. If yes, the next corresponding OI in the bending direction is taken in step 1407 and the process proceeds to step 1404 to check if the next OI will be after the bending too near to a next corresponding OI in the bending direction. Since the next OI is in the AVOS scope, the same bending factors are used.

If the next OI is not in the AVOS scope (step 1406), the AVOS processing is interrupted and the user is prompted in step 1408 of the error situation.

If the AVOS definitions are not applicable (step 1402), they are ignored in step 1409. In other words, the OI is not bent.

It should be appreciated that with proper values for the slope distance and the transitional length, OI is not actually bent but only moved in step 1405.

The steps shown in FIGS. 3 to 14 are not in an absolutely chronological order, and they may be executed in a different order than given here, or simultaneously. For example, instead of taken an OI to be processed and then processing SMs intersecting with the OI, one may take an SM to be processed and then process OIs intersecting with the SM. Another example is to create one or more OIs (step 515 in FIG. 5) just after SMs are organized in creation order, and then perform steps 602 to 615 for an OI in its original position (and original amount). Naturally, when an SM is added to a model, all intersecting OIs may be amended immediately after that, and vice versa when an OI is added to the model, all intersecting SMs may be applied immediately after that to the OI. Other functions may be carried out between the described steps or simultaneously with them. For example, in an implementation in which same type of SMs are not allowed to overlap, the process may be configured to check after a starting point and an end point of an SM are received, whether or not the SM overlaps with an earlier defined SM of the same type, and if it does, the user may be prompted to modify definitions, for example, so that they are not overlapping. Another example is that in one of possible changing implementations SM definitions contain an indicator, or corresponding information, that at least one of the parameter values of an SM is to be stored to OI definitions, in which case storing is performed. It is also possible to leave out some of the steps shown in the Figures. For example, collecting values in FIG. 4 may be left out, or the step 504 to 514 relating to ROs may be left out. Further, it is possible not to allow storing of AOs obtained by exploding an RO. It is also possible to replace some of the described steps by a step that produces a corresponding end result.

It should be appreciated that in an implementation in which the processing order is that an SM is taken to be processed and then process OIs intersecting with the SM are processed, a previous SM may cause an OI to intersect with an SM the OI did not intersect with in the previous or in the original situation, and vice versa. In the implementation, different rules may be used. For example, an SM may be applicable if it intersects with an OI in the original and/or previous and in the current situation. It may also depend on the type of the SM whether or not there are specific rules. For example, it may be checked whether or not the OI intersects with the AVOS because of a previous AVOS applied to the OI; and if that is the case, the AVOS definitions of the latter AVOS are not applicable.

To summon up, by means of SMs (and different SM types) it is possible to add and/or delete one or more features/parameter values of an OI, cut an OI to two OIs, combine two OIs to one OI, etc. All object properties may be given by means of SMs, it suffices to create an OI that intersects with one or more SMs. It should be appreciated that a model may initially comprise mere SM(s), and OI(s) will be added to the model later, or vice versa, or they may be added during one modeling session. Hence, with SMs the user has more freedom in modeling.

A further advantage provided by the SMs include that since the SMs are not associated with OIs, it is the intersection that is decisive, the user does not need to remember update OI definitions or associations. For example, a deletion of an OI causing one or more other OIs to move to an area where OIs should have value A for parameter X from an area where OIs have value B for parameter X, does not require any additional input from the user, the SM defining "use value A within this area" takes care that value B is ignored and value A used instead. If an association, "use value B for OIs having identifiers aa to ac", for example, is used, the user has to update the object identifiers defined in the association. If the object definitions are used as such, the user has to update the object definitions.

Figure 15:
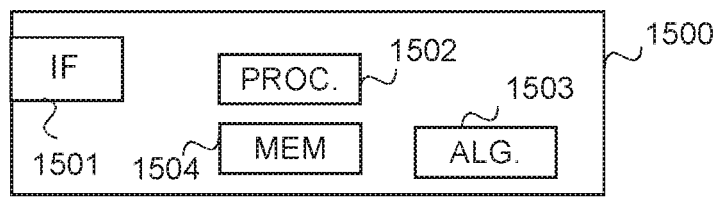
FIG. 15 is a schematic block diagram of an exemplary apparatus.

FIG. 15 is a simplified block diagram illustrating some units for an apparatus 1500 configured to be an apparatus comprising at least the SM modeling and managing unit. In the illustrated example the apparatus comprises one or more interfaces (IF) 1501 for interaction with a user, and possibly for receiving and transmitting information, a processor 1502 configured to implement at least the SM modeling and managing unit, or at least one of its sub-units, functionality described herein with a corresponding algorithm/algorithms 1503 and a memory 1504 usable for storing a program code required at least for the SM modeling and managing unit, i.e. the algorithms for implementing the functionality. The memory 1504 is also usable for storing other possible information, like the model or the working copy of the model. An embodiment provides a computer program embodied on any client-readable distribution/data storage medium or memory unit(s) or article(s) of manufacture, comprising program instructions executable by one or more processors/computers, which instructions, when loaded (downloaded) into an apparatus, constitute the SM modeling and managing unit. Programs, also called program products, including software routines, program snippets constituting "program libraries", applets and macros, can be stored in any medium and may be downloaded into an apparatus. In other words, each or some or one of the units/sub-units and/or the algorithms described above may be an element that comprises one or more arithmetic logic units, a number of special registers and control circuits.

Generally the processor 1502 is a central processing unit, but the processor 1502 may be an additional operation processor, controller, control unit, micro-controller, a single-chip computer element, a chipset, or the like connected to a memory and to various interfaces of the apparatus.

More precisely, each or some or one of the units and/or algorithms described herein may be configured as a computing device including at least a memory for providing storage area used for arithmetic operation and an operation processor for executing the arithmetic operation. Each or some or one of the units and/or algorithms described above may comprise one or more computer processors, logic gates, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments/implementations/examples or to perform functionalities from different embodiments/examples/implementations. In other words, each or some or one of the units and/or the algorithms described above may be an element that comprises one or more arithmetic logic units, a number of special registers and control circuits.

Further, the memory 1504 may include volatile and/or non-volatile memory, for example EEPROM, ROM, PROM, RAM, DRAM, SRAM, double floating-gate field effect transistor, firmware, programmable logic, etc. and typically store content, data, or the like. The memory 1504 or memories may be of any type (different from each other), have any possible storage structure and, if required, being managed by any database management system. The memory may also store computer program code such as software applications (for example, for one or more of the units/algorithms) or operating systems, information, data, content, or the like for the processor to perform steps associated with operation of the apparatus in accordance with examples/embodiments.

The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art. Examples of an external memory include a removable memory detachably connected to the apparatus and a cloud server.

It will be obvious to a person skilled in the art that, as the technology advances, the inventive concept can be implemented in various ways. The invention and its embodiments are not limited to the examples described above but may vary within the scope of the claims.

What is claimed is:

1. A computer implemented method comprising:
   running in a computer a modeling application that uses object instances to generate a model of one or more construction items, the object instances defining physical features of the one or more construction items;
   receiving, as a user input during modeling or when a model comprising one or more of the object instances is loaded:
   definitions defining at least one spatial modificator, the definitions for the at least one spatial modificator defining modifications to the model that change the physical features of the one or more construction items, the at least one spatial modificator comprising at least geometry information of the modifications defined by the at least one spatial modificator and location in the model where the modifications are to be applied, and
   at least one action definition, wherein the at least one action definition defines a predetermined degree of change by the modifications of the at least one spatial modificator to at least one parameter of the object instances;
   using the geometry information and the location of the at least one spatial modificator to detect an object instance that intersects with an influence area of the at least one spatial modificator in the model to provide an intersecting object instance, wherein the influence area is determined based on the geometry of the at least one spatial modificator and the location on the one or more construction items where the modifications are to be applied, the influence area providing margin for error in size or location of the at least one spatial modificator in the model, and the object instance intersects with the influence area when the object instance on the one or more construction items overlaps with the influence area on the one or more construction items;
   changing the intersecting object instance in the model, in response to detecting the intersecting object instance that intersects with the influence area of the at least one spatial modificator, the intersecting object instance changed according to the at least one spatial modificator and in accordance with the predetermined degree of change to the at least one parameter of the intersecting object instance as defined by the action definition.

2. The computer implemented method of claim 1, wherein the method further comprises:
   checking, prior to performing the changing, whether or not the at least one spatial modificator is applicable to the intersecting object instance; and
   performing the changing if the at least one spatial modificator is applicable to the intersecting object instance.

3. The computer implemented method of claim 2, wherein the definitions for a spatial modificator comprises at least one additional definition defining applicability of the spatial modificator in respect of at least one of a type of an object instance and a material of the one or more construction items an object instance models.

4. The computer implemented method of claim 1, wherein the method further comprises:
   receiving the definitions defining the at least one spatial modificator when the model is loaded;
   receiving user input adding at least one object instance to the model; and
   checking, whether or not the at least one object instance added to the model intersects with the influence area of at least one of the at least one spatial modificator.

5. The computer implemented method of claim 1, wherein the method further comprises:
receiving object instance definitions of at least one object instance when the model is loaded;
receiving user input comprising definitions defining at least one spatial modificator that is added to the model; and
checking whether or not an influence area of the at least one spatial modificator added to the model intersects with one of the at least one object instance.

6. The computer implemented method of claim 1, wherein the at least one action definition defines one of an object property, end detailing, bending radius, splitting detailing, spacing information, displacement, and avoiding a specific location.

7. A computer implemented method comprising:
running in a computer a modeling application that uses object instances to generate a model of one or more construction items, the object instances defining physical features of the one or more construction items;
receiving, as a user input during modeling or when a model comprising one or more of the object instances is loaded, definitions defining at least one spatial modificator, the definitions for the at least one spatial modificator defining modifications to the model that change the physical features of the one or more construction items, the at least one spatial modificator comprising at least geometry information of the modifications defined by the at least one spatial modificator and location in a model where the modifications are to be applied, and at least one action definition, wherein the at least one action definition defines a predetermined change by the modifications of the at least one spatial modificator to at least one parameter of the object instances;
using the geometry information and the location of the at least one spatial modificator to detect an object instance that intersects with the at least one spatial modificator in the model to provide an intersecting object instance, wherein an influence area is determined based on the geometry of the at least one spatial modificator and the location on the one or more construction items where the modifications are to be applied, the influence area providing margin for error in size or location of the at least one spatial modificator in the model; and the object instance intersects with the influence area when the object instance on the one or more construction items overlaps with the influence area on the one or more construction items; and
using, in response to detecting that the object instance intersects with the at least one spatial modificator, the action definition of the at least one spatial modificator according to the predetermined change as if the action definition were a corresponding parameter value in object definitions of the object instance intersecting with the at least one spatial modificator to model the one or more construction items, wherein using the action definition comprises at least one of overriding the corresponding parameter value in the object definitions or complementing the object definitions while maintaining the original object definitions intact.

8. The computer implemented method of claim 7, wherein the definitions for a spatial modificator comprise at least one additional definition defining at least one rule for applicability, and the method further comprises:
checking, prior to performing the using, whether or not the spatial modificator is applicable to the intersecting object instance; and
performing the using of the action definition of the spatial modificator if the spatial modificator is applicable to the intersecting object instance.

9. The computer implemented method of claim 7, wherein the method further comprises:
checking, in response to receiving a user input adding at least one object instance to the model, whether or not the at least one object instance added to the model intersects with at least one of the at least one spatial modificator; and
checking, in response to receiving a user input adding the at least one spatial modificator to the model, whether or not the at least one spatial modificator added to the model intersects with at least one of the object instances.

10. The computer implemented method of claim 7, the method further comprising:
providing the definitions for at least one of the at least one spatial modificator with information on an interaction region of the at least one spatial modificator; and
interpreting that each object instance intersecting with the interaction region intersects with the at least one spatial modificator.

11. An apparatus comprising at least one processor and at least one memory including computer program code, wherein the at least one memory and the computer program code are configured to, with the at least one processor, cause the apparatus at least to perform steps comprising:
running in the apparatus a modeling application that uses object instances to generate a model of one or more construction items, the object instances defining physical features of the one or more construction items;
using, in response to receiving as a user input during modeling or when a model comprising one or more of the object instances is loaded, definitions defining at least one spatial modificator, the definitions for the at least one spatial modificator defining modifications to the model that change the physical features of the one or more construction items, the at least one spatial modificator comprising at least geometry information of the modifications defined by the at least one spatial modificator and location in a model where the modifications are to be applied, and at least one action definition, wherein the at least one action definition defines a predetermined change by the modifications of the at least one spatial modificator to at least one parameter of the object instances;
using, in response to receiving as the user input during modeling or when the model comprising one or more of the object instances is loaded, the geometry information and the location of the at least one spatial modificator to detect an object instance that intersects with an influence area of the at least one spatial modificator in the model to provide an intersecting object instance, wherein the influence area is determined based on the geometry of the at least one spatial modificator and the location on the one or more construction items where the modifications are to be applied, the influence area providing margin for error in size or location of the at least one spatial modificator in the model; and the object instance intersects with the influence area when the object instance on the one or more construction items overlaps with the influence area on the one or more construction items, wherein the at least one action definition defines a predetermined degree of change to at least one parameter of the object instances; and changing, in response to detecting an intersecting object instance that intersects with the influence area of the at least one spatial modificator, the intersecting object instance in the model according to the predetermined degree of change to the at least one parameter of the intersecting object instance as defined by the action definition.

12. The apparatus of claim 11, wherein the at least one memory and the computer program code are configured to, with the at least one processor, further cause the apparatus to maintain, while changing the intersecting object instance, object instance definitions of the intersecting object, intact.

13. The apparatus of claim 11, wherein the at least one memory and the computer program code are configured to, with the at least one processor, further cause the apparatus to:

check, in response to definitions for a spatial modificator comprising at least one rule for applicability, prior to performing the using, whether or not the spatial modificator is applicable to the intersecting object instance; and perform the changing if the spatial modificator is applicable to the intersecting object instance.

14. A non-transitory computer-readable program storage medium with a computer program product comprising program instructions which, when run on a computing apparatus, causes the computing apparatus to perform steps comprising:

providing a modeling application that uses object instances to generate a model of one or more construction items, the object instances defining physical features of the one or more construction items, the modeling application uses at least one spatial modificator to modify at least one of the object instances intersecting with an influence area of the at least one spatial modificator in response to detecting the intersecting with the influence area of the at least one spatial modificator, so that definitions associated with the at least one spatial modificator are used for modifying the object instance intersecting with the influence area of the at least one spatial modificator, wherein the influence area provides margin for error in size or location of the at least one spatial modificator in the model, and the object instance intersects with the influence area when the object instance on the one or more construction items overlaps with the influence area on the one or more construction items; wherein the definitions associated with the at least one spatial modificator define modifications to the model that change the physical features of the one or more construction items, the at least one spatial modificator comprising at least geometry information of the modifications defined by the at least one spatial modificator and location in the model where the modifications are to be applied, and at least one action definition defines a predetermined degree of change to at least one parameter of the intersecting object instance; and modifying the intersecting object instance according to the predetermined degree of change to the at least one parameter of the intersecting object instance as defined by the at least one spatial modificator, wherein the at least one spatial modificator created on the model is storable to be part of the model as a separate modification instance.

15. A system comprising;

a modeling environment providing a modeling application with at least one object instance type for creating model object instances, the model object instances used to generate a model of one or more construction items, and with at least one spatial modificator type for creating a spatial modificator to modify at least one of the object instances intersecting with an influence area of the spatial modificator in response to detecting the intersecting with the influence area of the spatial modificator, so that definitions associated with the spatial modificator are used for modifying the at least one object instance intersecting with the influence area of the spatial modificator, wherein the influence area provides margin for error in size or location of the spatial modificator in the model, and the object instance intersects with the influence area when the object instance on the one or more construction items overlaps with the influence area on the one or more construction items; wherein the definitions associated with the spatial modificator define modifications to the model that change the physical features of the one or more construction items, the spatial modificator comprising at least geometry information of the modifications defined by the spatial modificator and location in the model where the modifications are to be applied, and at least one action definition defines a predetermined degree of change to at least one parameter of the at least one object instance, and wherein the intersecting object instance is modified according to the predetermined change to the at least one parameter of the intersecting object instance as defined by the spatial modificator, wherein the spatial modificator created on the model is storable to be part of the model as a separate modification instance; and at least one processor configured to:

run in the at least one processor the modeling application;

use, in response to receiving as a user input during modeling or when a model comprising one or more of the object instances is loaded, the definitions defining the spatial modificator; and modify, in response to detecting an intersecting object instance that intersects with the influence area of the spatial modificator, the intersecting object instance according to the at least the definitions of the spatial modificator.

* * * * *